March 3, 1942.   H. H. RUDD   2,275,203
ELECTRICAL BUS SYSTEM
Filed Oct. 6, 1937   7 Sheets-Sheet 2
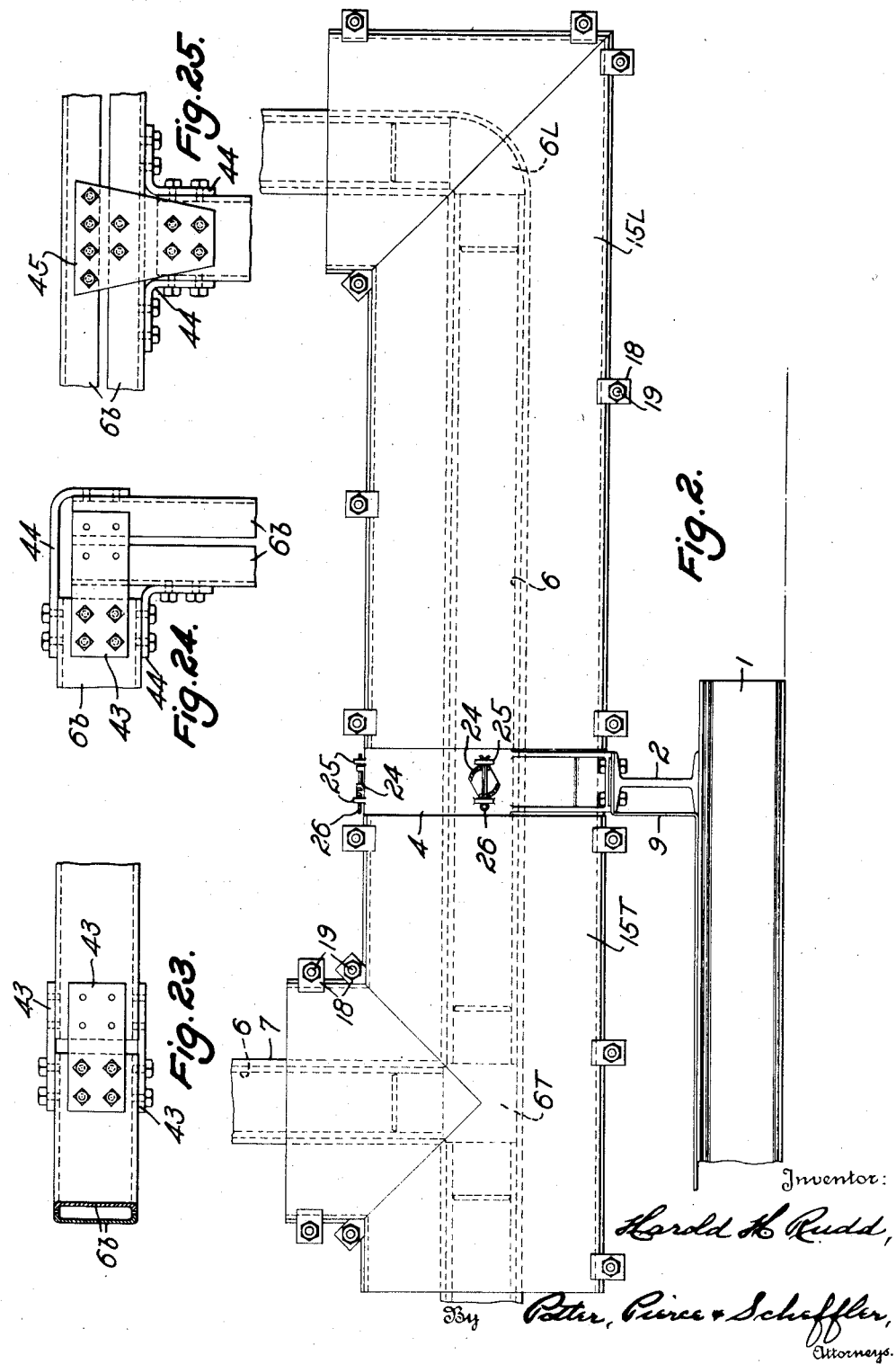

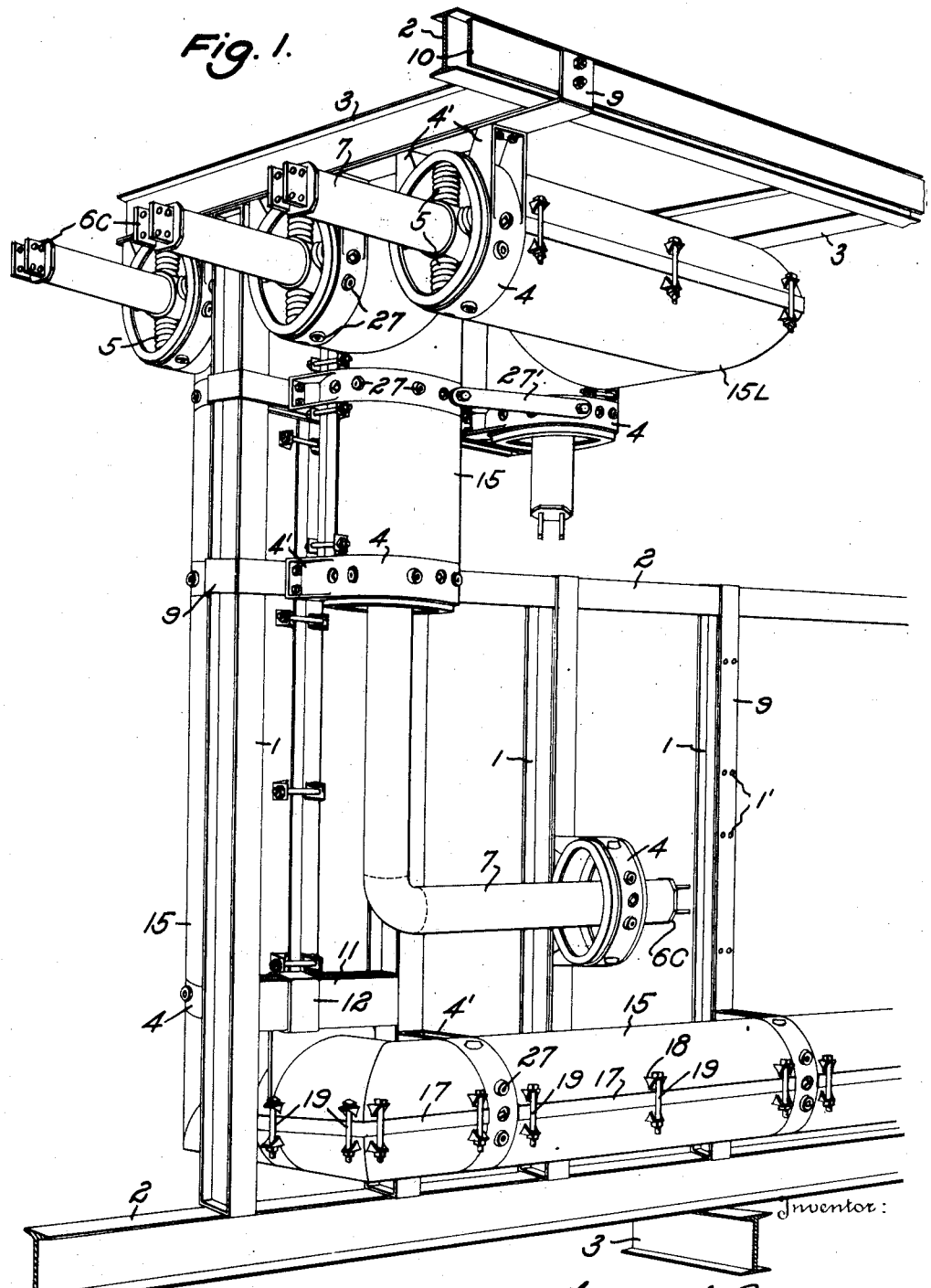

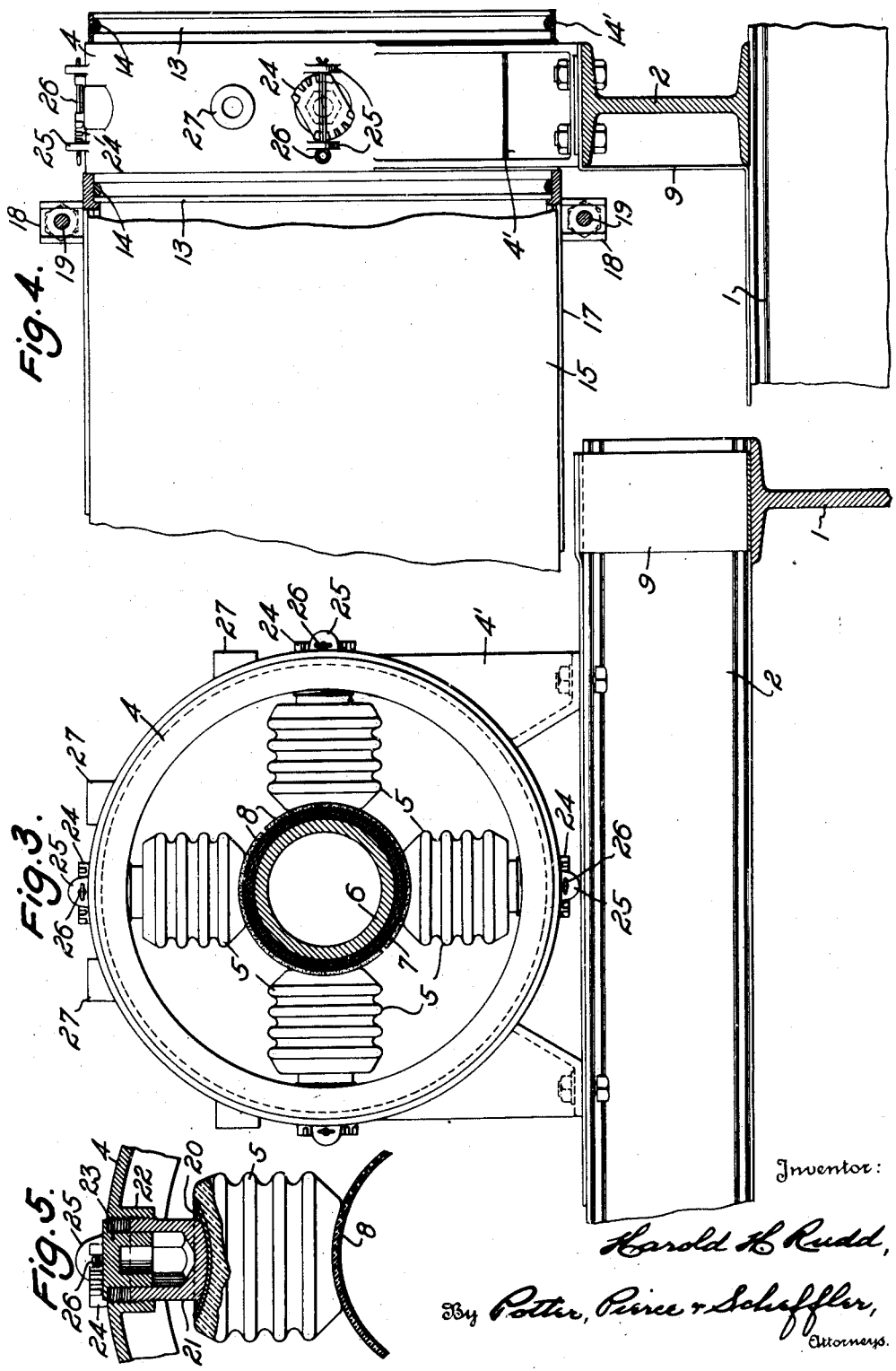

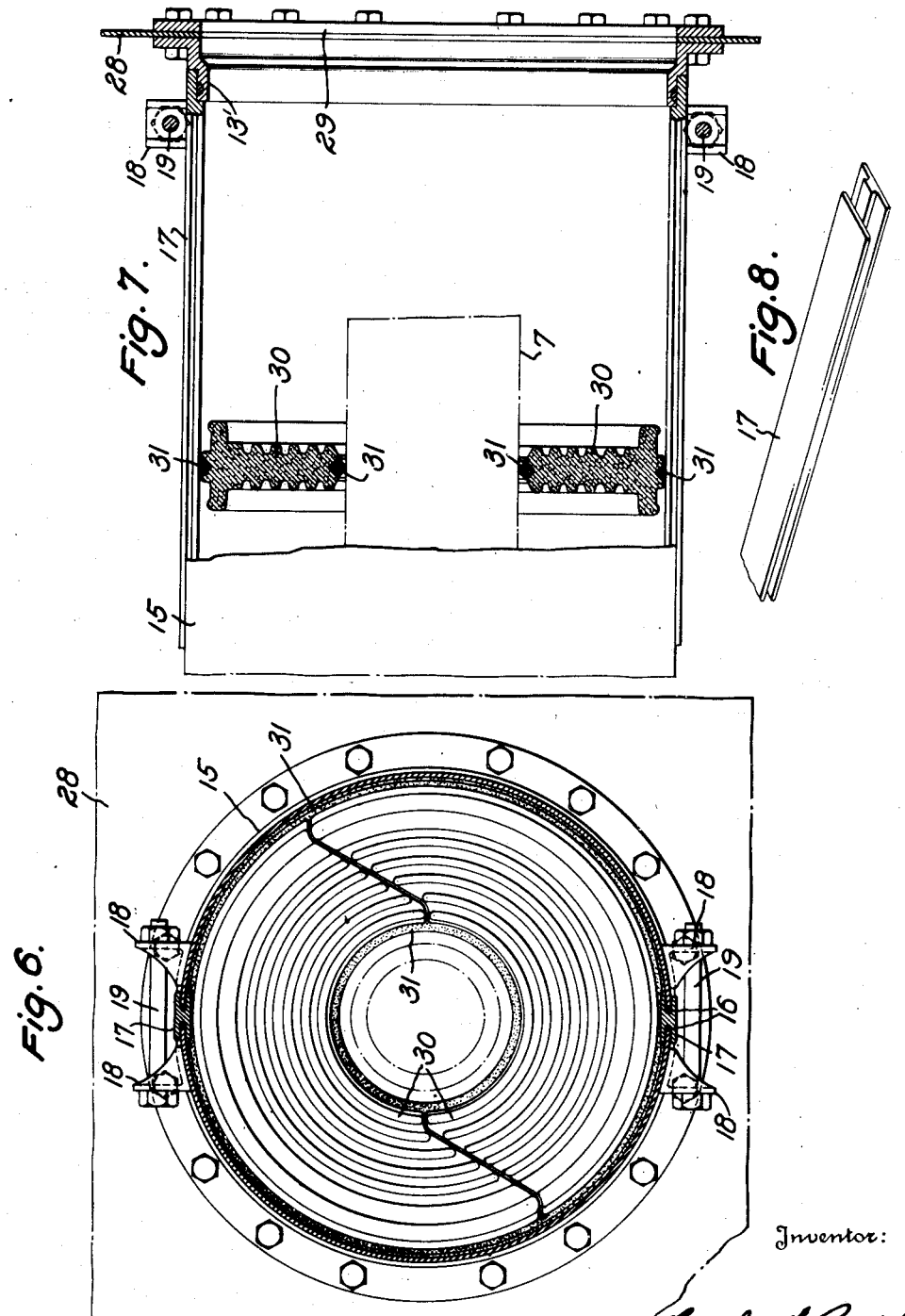

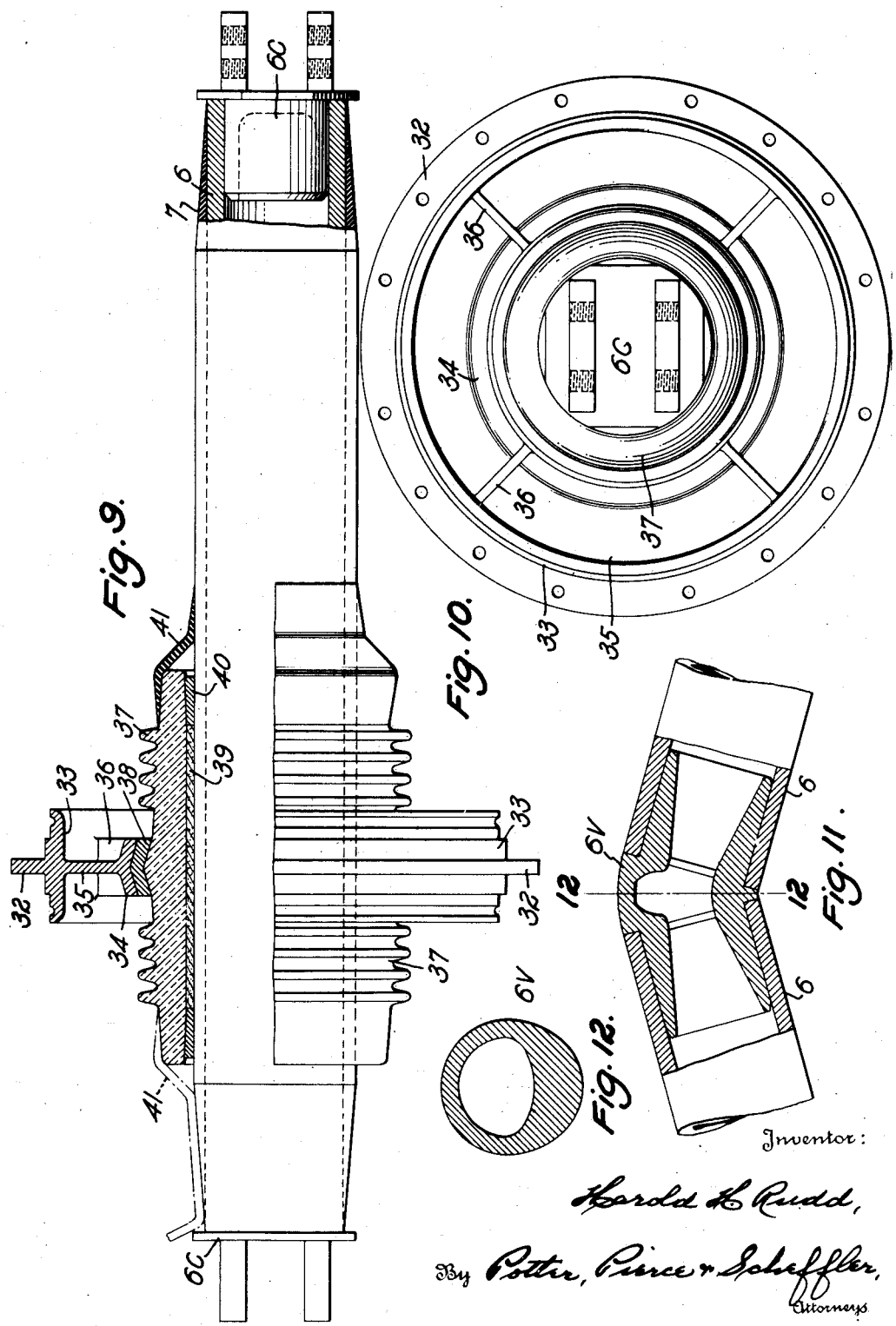

March 3, 1942.  H. H. RUDD  2,275,203
ELECTRICAL BUS SYSTEM
Filed Oct. 6, 1937  7 Sheets-Sheet 6
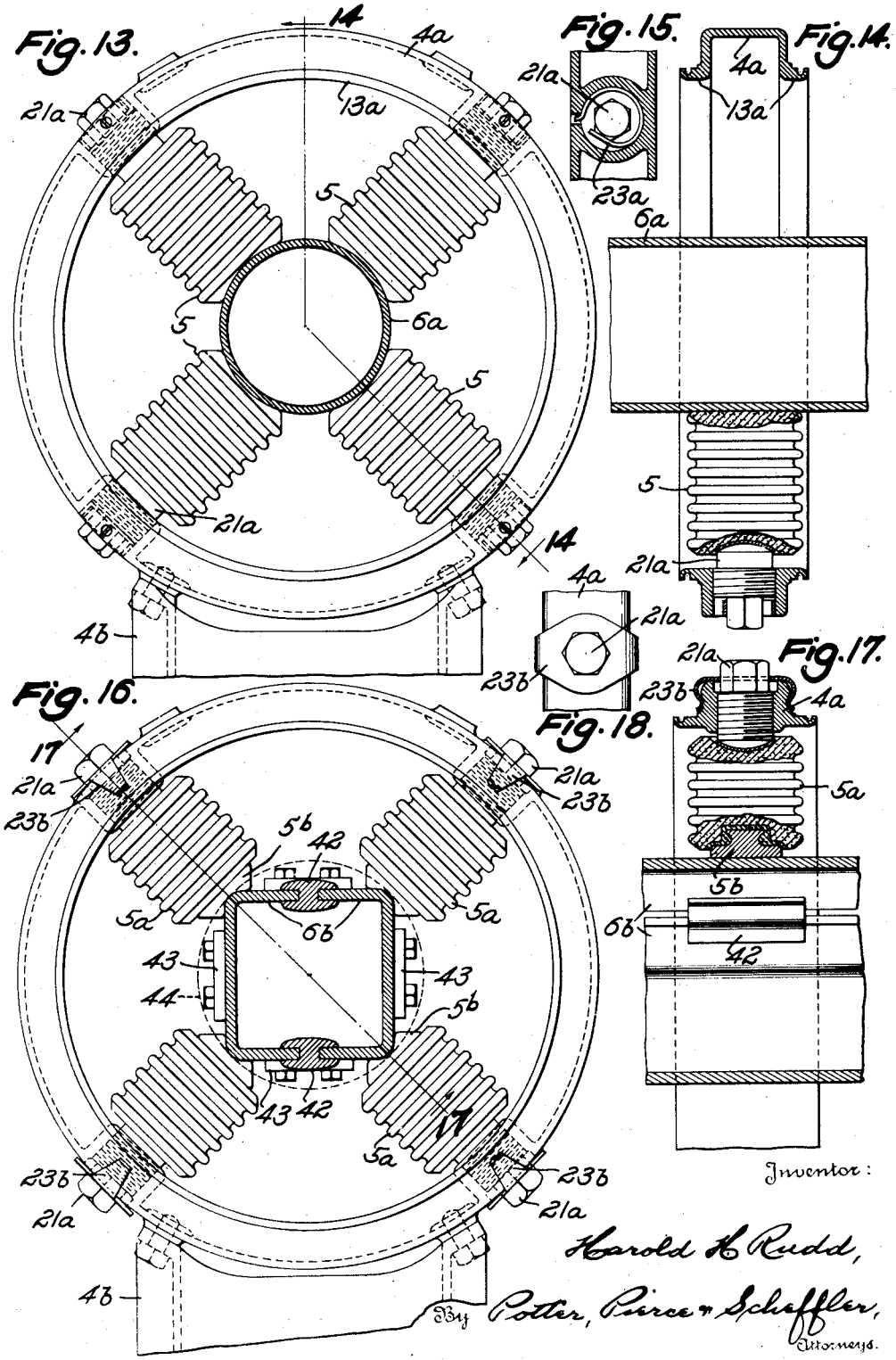

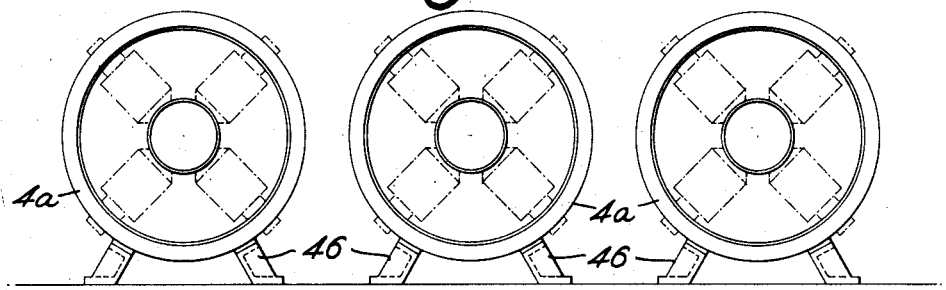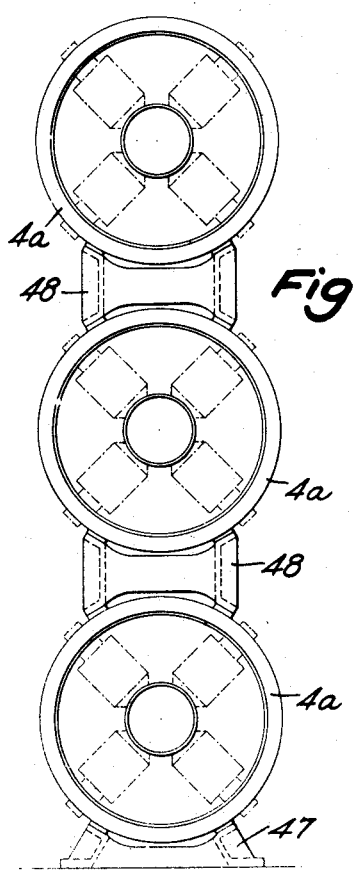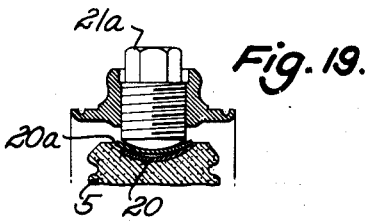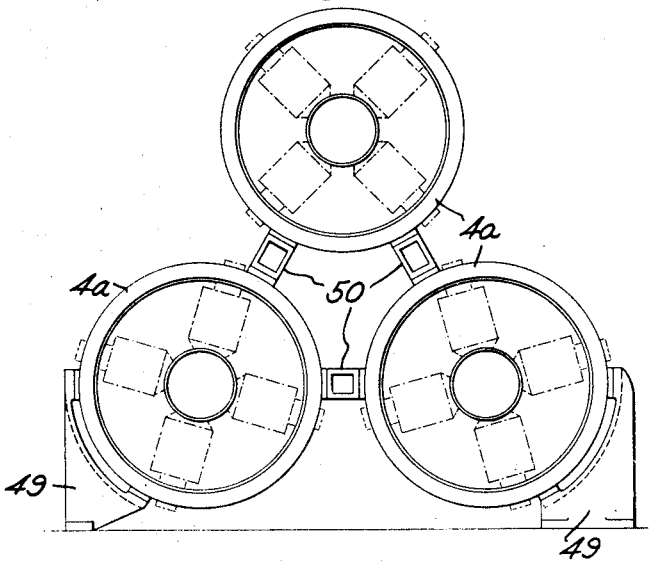

Patented Mar. 3, 1942

2,275,203

UNITED STATES PATENT OFFICE 2,275,203

ELECTRICAL BUS SYSTEM

Harold H. Rudd, Greensburg, Pa., assignor, by mesne assignments, to Railway and Industrial Engineering Company, Greensburg, Pa., a corporation of Delaware Application October 6, 1937, Serial No. 167,639

25 Claims. (Cl. 174—99)

This invention relates to electrical bus systems and more particularly to completely enclosed bus systems such as are adapted for use in generating stations and at other points where there is a heavy concentration of electrical energy at relatively high voltage.

The invention contemplates a bus system in which each bus is isolated from the other bus or buses by an individual metallic housing that is grounded at frequent intervals by low resistance, high current-carrying connections and which is spaced from the housing of all other buses. The invention will be described with reference to a three phase distribution system but it is equally applicable to other alternating current and to direct current systems.

An object of the invention is to provide an enclosed bus system of improved design, and in which the desired physical and electrical characteristics that afford a maximum protection against damage are attained with simple and relatively inexpensive constructions. An object is to provide a bus system including a supporting framework and, for each bus, a series of supporting frames rigidly secured to the framework, insulators for supporting the bus within the frames, and metallic duct sections mounted on the frames to complete the individual housing for that bus. More particularly, an object is to provide a bus system of the type stated in which the bus is of circular cross-section, the frames are annular, and the duct sections are formed by semi-cylindrical plates and gasket strips that are attached to the supporting frames. Another object of the invention is to provide novel bus supports including frames that encircle the bus, a plurality of insulators that have no metallic inserts, and adjustable elements carried by the frames for mounting the insulators between the bus and the frames. A further object is to provide a multiphase bus system which includes a skeleton framework, a plurality of supporting frames secured to the framework for carrying the individual buses, a low resistance ground bus carried by the framework and including copper bars secured between the several supporting frames and the framework, and plates to be clamped to the supporting frames to form substantially gas-tight ducts enclosing the several buses. More particularly, an object is to provide a bus system of the type last stated, wherein the supporting frames have annular shoulders at each side thereof, the shoulders being grooved to receive gasket material, the plates are approximately semi-cylindrical, and H-shaped strips carrying gasket material cooperate with the edges of the plates to form tight joints between the plates when the latter are drawn towards each other by clamp bolts.

These and other objects and advantages of the invention will be apparent from the following specification when taken with the accompanying drawings, in which:

Fig. 1 is a fragmentary perspective view of a three phase bus system embodying the invention;

Fig. 2 is a plan view of a portion of one bus and its support, the portion illustrated including a T-connection and a 90° bend in the bus;

Fig. 3 is a fragmentary transverse section through a bus, one supporting frame being shown in end elevation;

Fig. 4 is a side elevation of the same, the duct sections being shown, partly in section, at one side of the supporting frame;

Fig. 5 is a fragmentary sectional view illustrating an insulator and the elements for adjustably mounting the same on a supporting frame;

Fig. 6 is a transverse view through a duct mounted upon a plate which may be, for example, one wall of the casing which houses a switch, a reactor or the like;

Fig. 7 is a plan view, partly in section, of a portion of a duct and a flanged ring mounting the same on a plate;

Fig. 8 is a fragmentary perspective view of a gasket seat for sealing the ducts;

Fig. 9 is a side view, partly in section, of a section of bus, an insulator bushing and a flanged ring for supporting the bus where it passes through a floor, a wall, or the casing wall of an auxiliary unit;

Fig. 10 is an end view of the same;

Fig. 11 is a fragmentary sectional view through an angle joint in a bus;

Fig. 12 is a transverse section on line 13—13 of Fig. 11;

Fig. 13 is a sectional view through an insulator frame and a bare cylindrical conductor;

Fig. 14 is a sectional view on line 14—14 of Fig. 13;

Fig. 15 is a fragmentary sectional view showing the lock for the insulator adjusting screws of Figs. 13 and 14;

Fig. 16 is a fragmentary sectional view of a bare rectangular bus of two channels in a circular insulation frame;

Fig. 17 is a fragmentary sectional view on line 17—17 of Fig. 16;

Fig. 18 is a fragmentary plan view of the locking device for the adjusting screws of Figs. 16 and 17;

Fig. 19 is a fragmentary sectional view illustrating a modification of the insulator supporting system;

Figs. 20, 21 and 22 are somewhat schematic views illustrating different types of supports and geometrical arrangements of the separate buses; and Figs. 23, 24 and 25 are fragmentary plan views of bolted connections for rectangular bus sections such as shown in Figs. 16 and 17.

A bus system of the type contemplated by this invention is described and claimed in the copending application of Aldo M. de Bellis, Serial No. 132,431, filed March 22, 1937, now Patent No. 2,223,300, and the present invention relates, in general, to novel structural arrangement for accomplishing the objects of the de Bellis invention with greater efficiency and/or through the use of more economical constructions. The de Bellis bus system includes separate conductive and grounded housings enclosing each bus of the transmission system, the housings being spaced from each other and the buses being supported by insulators substantially centrally of the housings which are of such size that air or a gaseous medium within the housing provides adequate insulation under all normal or anticipated abnormal conditions.

As shown in Fig. 1, a structural framework of steel, aluminum or the like, extends continuously along the bus system and constitutes a complete direct support for the buses and their enclosures. The framework is mounted upon the masonry of the building in the case of an interior installation, or is anchored to the ground in any appropriate manner in the case of an outdoor installation. The particular framework for the bus section shown in Fig. 1 includes a plurality of vertical members 1 connected to horizontal members 2 that extend along the bus system and transverse horizontal members 3. The exact design of the supporting structure will vary with the geometry of the bus system, but the skeleton framework when appropriately anchored to the ultimate supporting medium constitutes the direct support for the bus system.

Insulator frames are secured to the framework to carry the individual conductors of the transmission system. The frames are of non-magnetic material, preferably of bronze, and each includes an annular section 4 and integral legs 4' for securing the frames to the supporting structure. A plurality of insulators 5 are supported by, and in the plane of, the insulator frames to bear against and support the conductors or buses substantially centrally of the insulator frames.

As best shown in Fig. 3, the conductors or buses 6 are tubular members of copper or the like that are wrapped with insulating tape 7 and, preferably, split cylindrical sleeves 8 of a molded plastic, such as Bakelite, are positioned between the wrappings 7 and the concave faces of the insulators 5. The relatively rigid sleeves 8 facilitate longitudinal movement of the bus and its wrapping with respect to the insulators 5 when temperature changes affect the length of the buses 6.

A low resistance grounding system for the several buses is provided by copper straps 9 that are located between the insulator frames and the steel framework, the straps 9 being electrically connected to a copper strip 10 that extends along the bus system and is supported by the steel framework. The ground conductor 10 may be at absolute ground potential or may be, if desired, spaced from absolute ground by a potential which permits actuation of relay and control devices in the event of a short circuit between any bus and one of its supporting insulator frames.

It may be necessary, as shown at the lower left corner of Fig. 1, for a bus to pass through the supporting framework of structural steel members. When a relatively short conductive loop is thus formed about a bus by frame members 1, 2 and a cross bar 11, it is advantageous to place a conductive band 12 of low resistance material, such as copper, about one of the frame members to develop a counter electromotive force in opposition to that established in the framework by current flow in the bus, thus reducing the losses due to induction in the supporting framework.

The annular sections 4 of the insulator frames have reduced diameter shoulders 13 that are circumferentially grooved to receive packing rings 14 upon which the ends of semi-cylindrical housing sections 15 are seated to form substantially air-tight ducts enclosing the buses. The edges of the housing sections 15 seat against gaskets 16 within the grooves of H-shaped members 17, and lugs 18 are welded to the plate sections 15 to receive bolts 19 for drawing the semi-cylindrical plate sections into contact with the gaskets on the rims 13 of frames 4 and the gaskets 16 of the members 17. This mounting permits some sliding of the housing sections on the frames with changes in length due to temperature changes.

The circular cross-section of the enclosing structure has decided electrical and mechanical advantages. Annular and semi-circular parts are more easily formed than rectangular or angular structures, and the weight of such parts is a minimum for given strength and size requirements. Tight joints may be formed between the longitudinally mating housing sections and with the frames as the gaskets will take up the usual size variations of commercial manufacture. The electrical characteristics of circular frames and ducts are superior to those of other cross-section when, as is usual, the bus system carries alternating current. The cylindrical metal members lie in equipotential surfaces about the bus and there is substantially no tendency towards eddy current flow in planes normal to the bus. Induced currents longitudinally of the bus may be reduced to a minimum by grounding only one end of each housing section upon the insulator frames. This isolation of longitudinally adjacent housing sections from each other is readily accomplished, as is indicated in Fig. 4, by placing a thin strip of insulation 14' about the gasket 14 at only one flange 13 of each insulator frame.

The housing sections are of non-magnetic material, steel plates being used for straight housing sections 15 at straight runs of the bus, and bronze or aluminum being preferably employed when special housing shapes must be made in mating halves to conform to the geometry of the bus at curved sections and branches. Typical housing sections 15T and 15L are shown in Fig. 2 for fitting about the bus at points where a T-section 6T and cast elbow 6L, respectively, connect straight bus sections 6.

The bus-connecting elements 6T and 6L are generally similar to the angle connecting element 6V shown in Figs. 11 and 12, and are hollow copper castings having ends that are machined to a slight taper and somewhat too large to enter the ends of the tubular bus sections 6. The bus ends are heated to permit insertion of the tapered connector ends and the resulting shrink fit provides a good mechanical and electrical connection. This type of connection is made in the shop where heating equipment and jigs for alining the parts are readily available.

Bolted connections are preferably made during the erection of the bus system at the power plant. Bus connectors 6C take the form of apertured plates projecting from hollow studs upon which the ends of the cylindrical bus 6 are shrunk, see Figs. 1 and 9. The connections between the straight tubular bus sections, both those made in the shop and the bolted connections made in the field are covered with windings of insulating tape.

The described constructions facilitate the erection of the bus system at the power plant. The structural framework is first erected, and the insulator frames are then mounted on the supporting structure. The ground bus or low resistance copper straps may be separately attached to the structure before the insulator frames are mounted but it is usually preferable to use the insulator frames, so far as practical, as the means for securing the ground bus to the framework. The taped sections of the bus are then threaded into the insulator frames and the insulators are mounted in the frames and adjusted, as will be described later, to support the bus sections centrally of the frames. The connecting straps, not shown, are then applied to secure the bus stections to those already in place, and insulating tape is wound about these joints. The housing sections 15 are mounted on the frames to form the enclosing ducts only after the assembly of the bus members is completed. The housing sections do not contribute to the mechanical support of the bus system as the bus members are supported by their respective insulator frames, and the latter are carried by a skeleton framework or suporting structure that is coextensive with the bus system and of such strength as to provide the direct rigid support for the entire system.

This progressive erection of the bus structure is illustrated graphically in Fig. 1. The supporting framework for the illustrated fragment of the bus system is all in place. The bus at the left side and bottom of the view is completely installed and enclosed by its duct. A part of the middle bus is completely installed and housed, and another section of the bus is threaded through its lower insulator frame but the insulators are not yet mounted in the frame to support the bus. The insulator frames for the elbow and horizontal run of the third bus are still to be mounted on the vertical members 1 of the framework at points indicated by the groups of bolt holes 1' that pass through the frame members and the ground bus straps 9 that overlie the same.

The ceramic insulators 5 that support the taped bus 6, 7 within the frames 4 are of novel construction in that both ends are free from the usual metal inserts. The inner ends of the insulators have cylindrical surfaces conforming to the radius of curvature of the bearing strips 8 that enclose the taped bus. The outer ends of the insulators are concave spherical surfaces, preferably metallized, in which lead bearing disks 20 are interposed to receive the convex ends of hollow pressure screws 21 that are threaded into internal bosses 22 of the frames 4. The bores of screws 21 are non-circular, preferably of hexagon cross-section, and inserts 23 of similar non-circular exterior shape are fitted into the screws 21, the inserts having castellated heads 24 that rest upon the frame 4 between ears 25 that receive cotter pins 26 to lock the inserts and thereby the screws 21 against rotation. The insulators are not anchored at either end and, therefore, are not subject to bending stresses. The insulators may rock or tilt to a small extent in response to movement of the bus due to temperature changes, but they are subjected only to compression stresses.

As shown in Figs. 3 and 4, the insulator frames have a plurality of bosses 27 that may be used to secure short struts 27' between frames of adjacent buses to reinforce the assembly.

Each bus, with all associated elements such as circuit breakers, switches, and the like, is separately enclosed in its individual duct. An appropriate mounting for the housing sections on the casing wall 28 of an auxiliary bus unit is shown in Figs. 6 and 7. A grooved sleeve 13' similar to the flanges 13 on frames 4 is bolted to the casing wall 28 which is reinforced by an internal ring 29. The duct sections adjacent an oil-filled unit, such as a circuit breaker, may be protected against the entrance of oil when the breaker opens by a baffle such as shown in Figs. 6 and 7. The insulator disk is formed in two symmetrical sections 30 that may be placed about the taped bus 6, 7 after it is installed in the insulator frames. The inner and outer edges of the disk sections have V-shaped grooves for receiving packing strips 31 of diamond-shaped cross-section to provide tight joints between the insulator disk and, respectively, the taped bus and the housing sections 15 which clamp the disk upon the bus. An alternative arrangement for use at the casing wall of an auxiliary unit or at a point where the bus passes through the floor or a wall of the building is shown in Figs. 9 and 10. The ring support for the bus comprises an annular member having a radially projecting flange 32 for bolting to the casing or building wall, and oppositely directed grooved flanges 33 corresponding to the flanges 13 of the insulator frames 4. An internal annular ring 34 of concaved V-section is joined to the flanges 33 by a web 35 that may be reinforced by flanges 36. An insulator bushing 37 extends through the ring member and has a projecting V-shaped flange that is anchored to the section 34 of the supporting ring by cast die metal 38. The taped bus 6, 7 extends through the bushing 37 and is sealed in place by a plastic packing 39 and wedge rings 40. Insulating tape 41 is wound over the joints between the insulator 37 and the taped bus after the bus is mounted within the insulator. The web 35 is imperforate when an isolation of adjacent duct sections is desired.

It is not essential that the bus be insulated by a taped winding since, as shown in Figs. 13 and 14, a bare tubular conductor 6a may be supported in an annular insulator frame 4a by the porcelain insulators 5. The annular frames 4a have projecting grooved flanges 13a for supporting the semi-cylindrical housing sections and separate brackets 4b are bolted to the rings 4a to mount the same upon a support. The screws 21a for adjusting the insulators against the bus 6a have hexagonal heads against which the ends of locking springs 23a bear to prevent inadvertent rotation of the adjusting screws.

The known rectangular bus sections comprising two channel shaped members 6b may be supported in annular insulator frames when H-shaped inserts 42 are provided to take the thrust of the insulators, see Figs. 16 and 17. The insulators 5a preferably have metal inserts 5b that terminate in V-shaped surfaces conforming to the corner surfaces of the bus member. Adjusting screws 21a may be substantially as shown in Figs. 13 and 14, and the lock for the screws may be spring members 23b having apertures conforming to the hexagon heads of the screws 21a and legs that snap over the rim of the insulator frames 4a. The open rectangular form of bus provides maximum cooling since air circulates through the interior of the bus.

It might be expected that the maximum protection against flashover would be obtained when a tubular bus is used, but the rectangular bus shape will not decrease the protection when the minimum arcing path is equal to the constant length arcing path between a tubular bus and the cylindrical housing. This condition is fulfilled when the outer edges of the connecting straps 43 and bolts at joints in the bus, lie within the cylindrical surface 44, see Fig. 16, defined by the corners of the bus. Various joint constructions may be built up from flat and angular straps, Figs. 23 to 25. The flat straps 43 may be used alone for joints between alined bus sections, while combinations of flat straps 43 and bent straps 44 will be used where the bus sections meet at an angle. Branch connections preferably are made with wedge shaped flat straps 45 and a pair of bent or angle straps 44. The straps are of such cross-section as to carry the load without undue heating and to provide mechanical rigidity.

As shown in Fig. 19, a resilient washer 20a may be interposed between the adjusting screw 21a and the lead bearing washer 20 that is seated against the outer concave surface of the insulator 5 to provide substantially constant pressure over a wide range of temperature.

The bus structure may, in some instances, be such that an independent supporting framework of structural steel members is not required. As shown in Fig. 20, the insulator rings 4a may be mounted in horizontal alinement upon the supporting medium, by bracket legs 46. A vertically arranged self-supporting structure, as shown in Fig. 21, may include a lower insulation frame 4a mounted on a rigid support by a bracket 47, and spacer members 48 that are bolted to the adjacent ring members 4a to secure the same in vertical arrangement. Another geometrical arrangement of the insulator frames 4a, as shown in Fig. 22, comprises a pair of frames 4a secured to a support by brackets 49 and struts 50 between those frames and an upper frame 4a.

The invention imposes no design limitations upon the electrical structure as the skeleton framing and insulator frames may be erected to support a bus system of any geometry. The housing sections are not essential to the mechanical support of the buses and may be appropriately shaped to fit any installation. The insulation of the bus from its duct by compression insulators and air or gas permits the circulation of the insulating medium for cooling, and provides ample space for relay-controlled heaters that may be used, when the bus is not carrying current, to keep the temperature within the duct above that of the surrounding air, thus preventing condensation within the duct.

The described annular frame construction is well adapted to resist abnormal stresses due to current surges. The elongation of an annular frame in one plane due to a side thrust of the bus tends to decrease the width of the frame in the plane normal to the thrust plane. All of the insulators are thus stressed in compression to resist deformation of the insulator frame. Four insulators are preferably used as the increased frame cross-section required for equal rigidity when but three symmetrically arranged insulators are employed offsets the decreased insulator costs. Similarly, the added cost of a fifth insulator could not be offset by the decreased cost of a somewhat lighter insulator frame.

It is to be understood that the several embodiments herein shown and described are indicative of the preferred methods of practicing the invention but that various changes may be made within the spirit of my invention as set forth in the following claims.

I claim:

1. In an electrical installation, a bus, a rigid support adjacent said bus, a plurality of insulator frames in spaced relation, each frame including a portion rigidly secured to said support and a portion encircling the bus, insulating means mounted on said frames and rigidly supporting said bus, and a duct enclosing said bus; said duct comprising a plurality of housing sections and means for securing the same to said insulator frames; each housing section extending between a pair of adjacent frames and being split longitudinally to permit its individual removal from and replacement upon its associated insulator frames.

2. An electrical installation as claimed in claim 1, wherein said housing sections comprise mating half-sections of non-magnetic metal plate material having edges lying approximately in an axial plane through the bus, in combination with H-shaped strips carrying gasket material in the grooves thereof, the edges of said half-sections being fitted into said grooves, and wherein said securing means comprises means for drawing said half-sections into said grooves.

3. An electrical installation as claimed in claim 1, wherein said frames have grooved flanges at the opposite faces thereof, gasket material in the grooves of said flanges, and said housing sections comprise mating half-sections having ends supported by the flanges of adjacent frames, in combination with gasket members between the edges of the mating half-sections, and wherein said securing means comprises means for clamping corresponding half-sections upon the frames and into sealing engagement with said gasket members.

4. An electrical installation as claimed in claim 1, wherein said housing sections are of non-magnetic metal, in combination with means insulating longitudinally adjacent housing sections from each other, said insulating means comprising insulating material between one end of each housing section and the frame to which it is secured.

5. In an electrical installation, a bus, a supporting structure extending along said bus, a plurality of insulator frames secured to said supporting structure in spaced relation, each frame including an annular body portion extending around said bus and mounting means extending outwardly from the annular portion for securing the frame to the supporting structure, insulating means mounted in said frames to support said bus, and a duct enclosing said bus; said duct comprising longitudinally mating housing sections extending between each pair of adjacent frames, and means for securing said housing sections to the annular portions of the insulator frames.

6. An electrical installation as claimed in claim 5, wherein each insulator frame has a circumferentially grooved cylindrical flange at each face thereof; said housing sections comprise a pair of half-sections between adjacent insulator frames, the ends of said half-sections conforming to the shape of said flanges, gaskets in the grooves of said flanges, gasket means between the adjacent edges of each pair of half-sections of housing; and said securing means comprises means for drawing the half-sections of a pair together to engage said gasket means and to seat the ends of the half-sections on the gaskets of said flanges.

7. In a metal-enclosed power transmission system, the combination with a conductor, a rigid structure adjacent said conductor, and a longitudinally sectionalized housing extending around and enclosing said conductor; of supporting means securing said conductor to said rigid structure and supporting said housing about and spaced from said conductor; said supporting means comprising insulator frames spaced longitudinally of the conductor and secured to said rigid structure, insulators mounted on the frames to support said conductor, and housing-receiving seats on said frames for supporting the housing sections, each housing section extending between a pair of adjacent frames and including a plurality of longitudinally mating duct-forming members structurally independent of and detachably secured to the associated insulator frames.

8. In an electrical bus system, the combination with a bus, of an insulator frame encircling the bus, at least three insulators radially disposed in the plane of the insulator frame and symmetrically disposed about the bus, the inner ends of each insulator being grooved to conform to the shape of the bus section upon which they bear, the outer end of each insulator being concave, and means adjustably mounted upon the insulator frame to bear against the concave ends of said insulators, whereby said insulators are subjected only to compression stresses when held against said bus by said adjustably mounted means.

9. The invention as claimed in claim 8, wherein said adjustably mounted means comprises members threaded into said frame and adjustable from the exterior thereof to press the associated insulator to said bus.

10. The invention as claimed in claim 8, wherein said bus comprises a tubular conductor having an insulating covering thereon.

11. In an electrical installation, a bus member, an annular insulator frame extending around said bus member, at least three insulator members symmetrically disposed about said bus member and extending radially therefrom in the plane of the insulator frame, the inner end of each insulator member bearing upon and conforming to the shape of the bus member and the outer end of each insulator being concave, and means adjustably carried by the frame and seated in the concave ends of the insulators for holding the insulators to the bus member.

12. The invention as claimed in claim 11, wherein said bus member is of hollow rectangular form and comprises two channel-shaped conductors.

13. The invention as claimed in claim 11, wherein said bus member has a conductive outer surface for engagement by said insulator members, and each insulator member comprises a body of insulating material carrying a metallic insert at its inner end, the outer surface of the insert conforming to the bus section against which it bears.

14. In an enclosed electrical power transmission system, an insulator frame for securing a power conductor and its enclosure to a rigid structure, said frame comprising an annular section for encircling the conductor and having cylindrical seats at the opposite faces thereof to receive the ends of longitudinally-mating housing-forming plates, bracket means extending from the frame between said cylindrical seats for mounting said frame upon the rigid support, and conductor-mounting means including at least one member adjustably mounted upon said frame between said cylindrical seats for mounting said conductor within and insulating the same from said frame.

15. In a metal-enclosed power transmission system, an insulator frame for securing a power conductor and its metal enclosure to a rigid structure; said frame comprising an annular section having cylindrical seats at its opposite faces to receive the ends of longitudinally mating housing-forming plates, means between and spaced from said seats for rigidly securing the frame to the rigid structure, and a plurality of threaded members in angularly spaced relation about said frames to engage conductor-supporting insulators, said members extending through said frame at points located between said seats, whereby said threaded members may be adjusted on said frame whether or not the housing-forming plates are mounted on said seats.

16. An enclosed electrical power conductor of the type including a rigid structure, a conductor extending along the structure, a longitudinally sectionalized housing enclosing said conductor, each housing section including a plurality of longitudinally mating plates, and means securing said conductor and housing to said structure, characterized by the fact that said securing means includes, between each pair of longitudinally adjacent sections of said housing, a frame having a ring portion encircling said conductor, cylindrical seats on the frame for receiving the ends of adjacent housing sections, securing means between said seats for mounting said frame upon said rigid structure, and insulator means including mounting screws extending through said frame between said seats for supporting the conductor on an insulating the same from the frame.

17. An enclosed electrical power conductor as claimed in claim 16, wherein said securing means is adapted to mount said frame upon a plane-surfaced rigid structure, and said insulator means includes four screws threaded into the frame, the axis of two of said screws being parallel to the surface of the rigid structure.

18. An enclosed electrical power conductor as claimed in claim 16, wherein said securing means is adapted to mount said frame upon a plane-surfaced rigid structure, and said insulator means includes four screws threaded into said frame and with the axis thereof uniformly spaced about the frame and each at 45° to the surface of the rigid structure.

19. An insulator frame as claimed in claim 16, wherein said bracket means is adapted to mount the frame upon a plane-surfaced support, and there are four screws threaded into the frame, the axis of two of the screws being parallel to the surface of the support.

20. In an electrical installation, the combination with a bus, of means including longitudinally spaced insulator frames and insulators carried by said frames for supporting said bus, each frame having a mounting portion and a bus-encircling portion with a cylindrical flange projecting from at least one face thereof, a plurality of longitudinally mating sections of housing between each pair of adjacent frames for forming an enclosure for said bus, and means for securing housing sections to each other and upon the frame flanges.

21. The invention as claimed in claim 20, wherein said supporting means includes for certain of said frames a unitary insulator surrounding said bus and mounted in the associated frame.

22. In an electrical installation, the invention as set forth in claim 20, wherein the mounting portion of each frame is adapted to secure the frame to a plane-surfaced supporting structure, and there are four uniformly spaced insulators within each frame.

23. In an electrical installation, the invention as set forth in claim 20, wherein the mounting portion of each frame is adapted to secure the frame to a plane-surfaced supporting structure, and there are four uniformly spaced insulators within each frame, the axes of two of said insulators being parallel to the plane surface of the supporting structure.

24. In an electrical installation, the invention as set forth in claim 20, wherein the mounting portion of each frame is adapted to secure the frame to a plane-surfaced supporting structure, and there are four uniformly spaced insulators within each frame, the axes of the insulators being each at 45° to the plane surface of the supporting structure.

25. The method of supporting and protecting a bus structure which comprises erecting a skeleton framework along the path to be occupied by the bus structure, securing a series of insulator frames to said framework, progressively mounting preformed sections of the bus within the series of frames and on insulators carried by the respective frames, connecting said mounted bus sections to each other, and then attaching housing sections to said frames after said bus sections are mounted and connected, thereby to form ducts enclosing the buses.

HAROLD H. RUDD.